United States Patent [19]
Nowak

[11] Patent Number: 5,356,244
[45] Date of Patent: Oct. 18, 1994

[54] HEAD FRAME BORING METHOD AND APPARATUS

[75] Inventor: Florian I. Nowak, Newington, Conn.

[73] Assignee: Nowak Products, Inc., Newington, Conn.

[21] Appl. No.: 163,517

[22] Filed: Dec. 9, 1993

[51] Int. Cl.$^5$ ............................................. B23B 1/00
[52] U.S. Cl. ................................ 408/1 R; 82/1.4; 408/80; 408/708
[58] Field of Search ................ 408/54, 80, 81, 83, 408/708, 1 R; 82/1.2, 1.4, 128

Primary Examiner—Steven C. Bishop
Attorney, Agent, or Firm—Ira S. Dorman

[57] ABSTRACT

The method, apparatus and system utilize the saddle on which the stationary head of an automatic screw machine is normally mounted, for supporting a cylindrical boring bar. Rotation and advancement of the bar on the saddle surface enables reboring of the cylindrical opening through the rotary head-mounting section of the machine, which rebored opening will be precisely coaxial with the surface of the saddle.

9 Claims, 5 Drawing Sheets

HEAD FRAME BORING METHOD AND APPARATUS

BACKGROUND OF THE INVENTION

It is of course common for machines to have aligned cylindrical bearing surfaces upon which its operating components are mounted. For example, in the automatic screw machines provided by Davenport Machine Tool Co., Inc., of Rochester, N.Y., the so-called "revolving" and "stationary" heads are aligned in such a coaxial relationship. Although being pinned against rotation after initial alignment, the stationary head is supported on a semi-cylindrical bearing surface that is coaxial with the bearing surface of the frame in which the revolving head is journalled.

To correct for wear during use, it is common practice to rebuild the revolving head frame opening of such a machine, to enable reboring to size. It is of course imperative that a precise coaxial relationship with the saddle bearing surface be established for the newly bored head frame surface, and that has heretofore been most difficult to achieve.

SUMMARY OF THE INVENTION

Accordingly, a broad object of the present invention is to provide a method of boring for producing a cylindrical opening through a portion of a machine, which opening lies in precise coaxial relationship with an existing cylindrical surface of the machine. Related objects are to provide apparatus and a system for implementation of the method.

More specific objects of the invention are to provide such a method, apparatus and system for boring the revolving head-mounting frame portion of an automatic screw machine.

It has now been found that certain of the foregoing and related objects of the invention are attained by the provision of a method of boring which serves to produce a cylindrical opening on an axis through the revolving head-mounting frame portion of a machine. The machine to which the method is applied has a saddle with a semi-cylindrical bearing surface, disposed rearwardly adjacent the frame portion and on the axis of the opening that is to be bored, for underlying support of a stationary head of the machine. The method employs a boring bar that has a cylindrical body of equal diameter to the bearing surface, and a boring tool on an end portion of the body. With the stationary head removed and the boring bar body seated directly on the bearing surface, and with the boring tool forwardly disposed, the boring bar is advanced linearly and rotated on the established axis to cause the tool to effect boring of the frame portion, and thereby to produce the intended cylindrical opening therethrough. In the preferred embodiments, the boring bar will be advanced and rotated at constant linear and angular velocities.

Other objects of the invention are attained by the provision of apparatus for implementing the method described. The apparatus comprises a boring bar having a cylindrical body with opposite end portions, and a clamping assembly disengageably attachable to the machine. The diameter of the boring bar body is equal to that of the bearing surface of the machine saddle, and the boring bar has a boring tool and a drive connection on its opposite end portions. The clamping assembly includes components that are disposed to overlie the saddle of the machine, and that are constructed to slidably engage the cylindrical body of the boring bar, for linear advance and rotation on the established axis, and to hold it in stable engagement upon the bearing surface.

The clamping assembly will normally include adjustable biasing means for applying clamping force of variable magnitude upon the boring bar. In preferred embodiments, the assembly will comprise mounting means for disengageable attachment to the machine, and a plurality of arms extending from the mounting means and including end portions disposed in overlying contact with the boring bar. The end portions of the arms will desirably include means for distributing lubricant to the contacted surface of the boring bar body.

Additional objects of the invention are attained by the provision of a system, comprising the apparatus hereinabove described in combination with drive means and connecting means. The drive means produces driving force to effect rotation and linear advance of the boring bar, and the connecting means operatively connects the drive means to the drive connection on the boring bar, for transmitting driving force to it. Preferably, the drive connection will comprise a mechanism for so transmitting driving force as to maintain rotation and advance of the boring bar at constant angular and linear velocities.

DETAILED DESCRIPTION OF THE ILLUSTRATED EMBODIMENT

Figure 1:
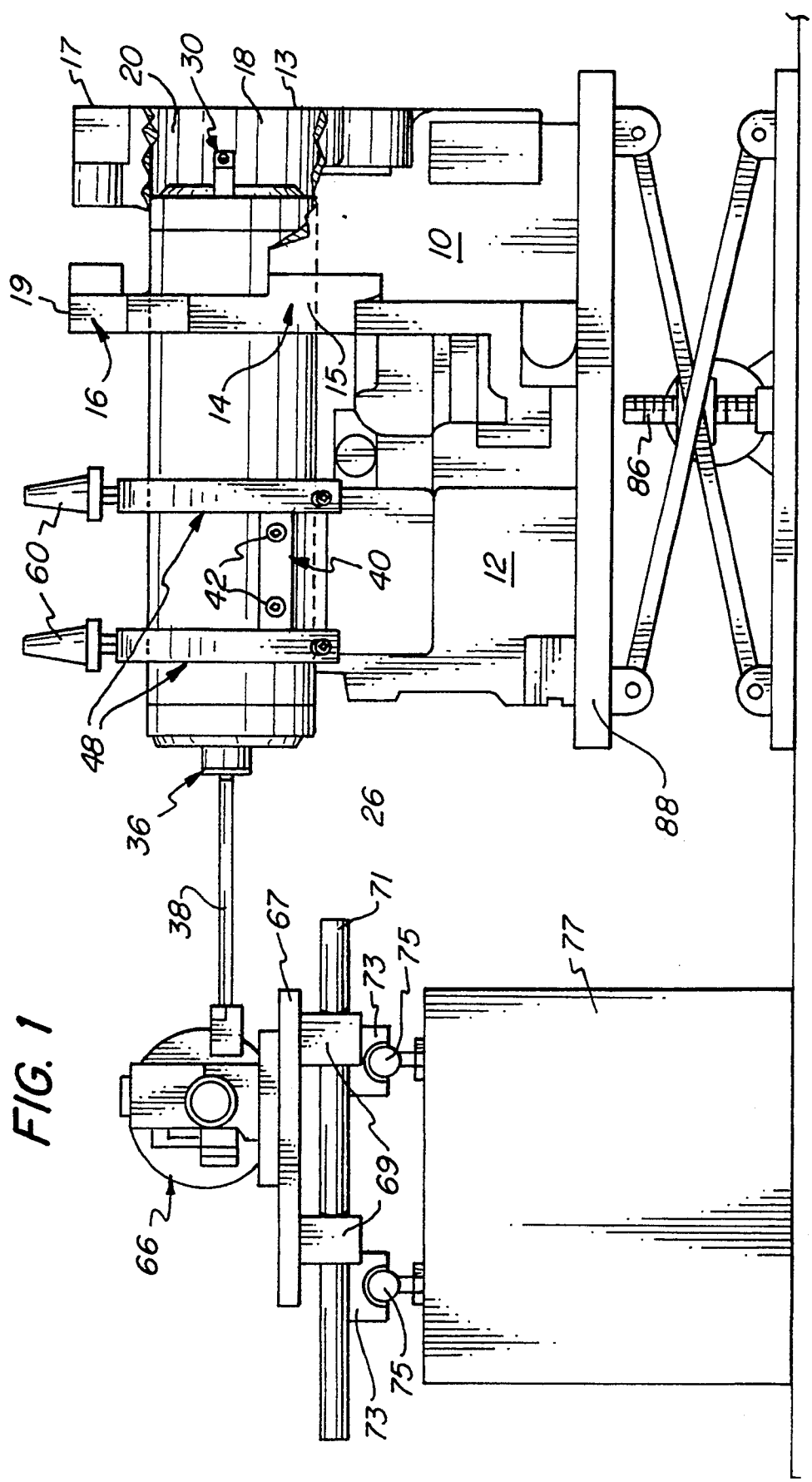
FIG. 1 is a side elevational view of a system embodying the present invention, arranged and installed for reboring of a cylindrical opening through the frame portion of an automatic screw machine, in which opening the revolving head of the machine is normally mounted.
Figure 2:
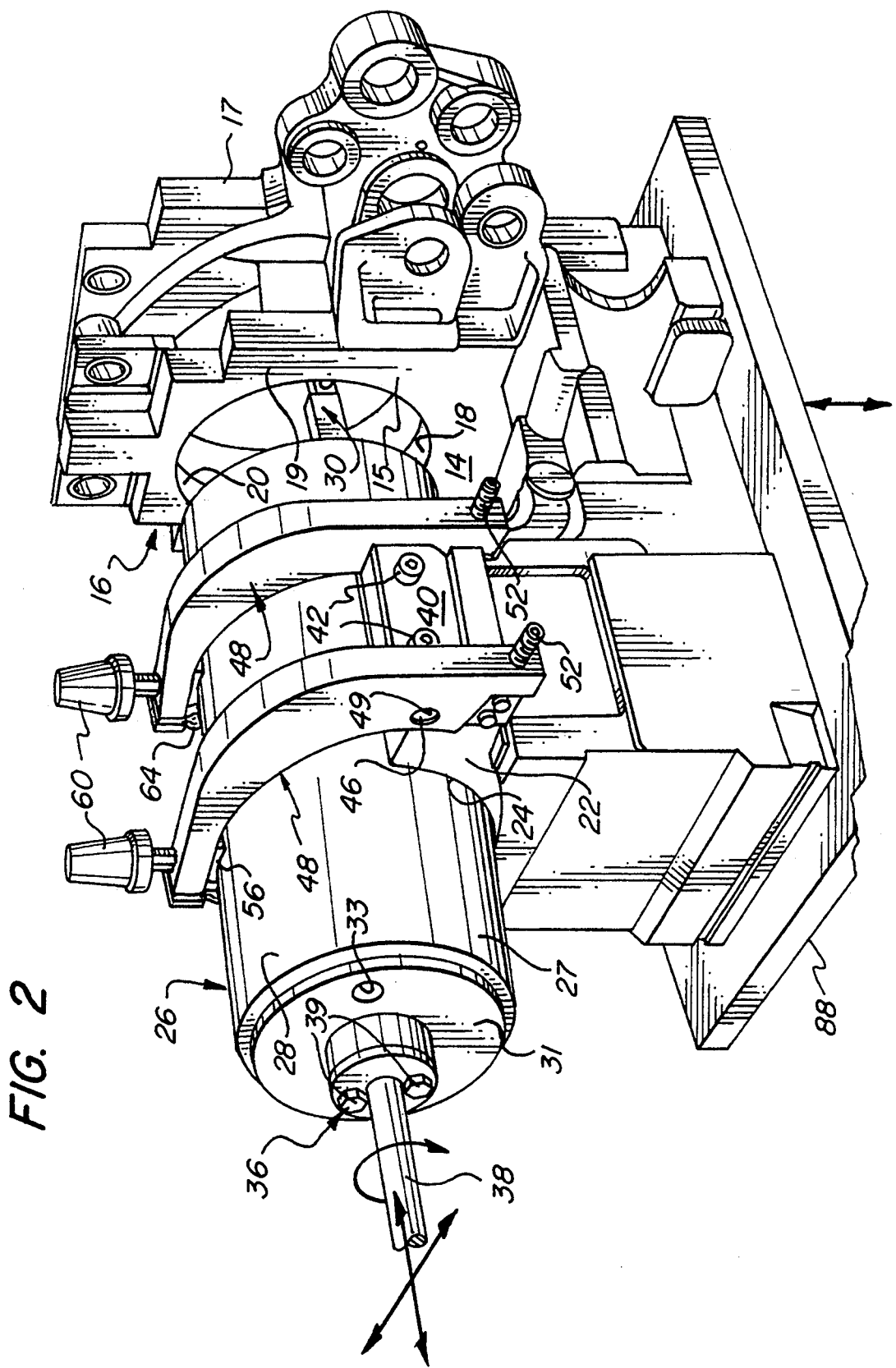
FIG. 2 is a perspective view depicting the apparatus of the invention as so installed and arranged.
Figure 3:
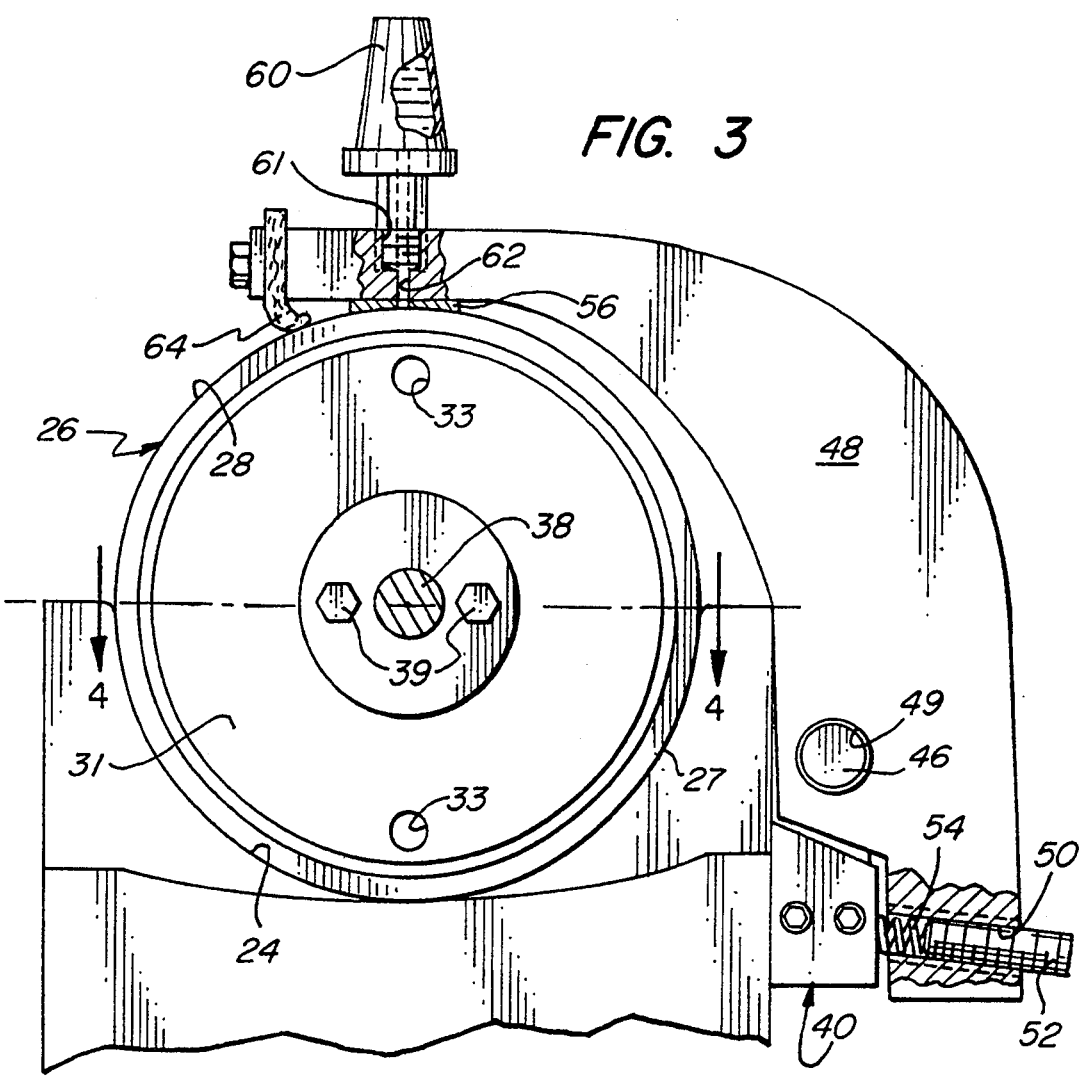
FIG. 3 is a fragmentary, rear end view of the apparatus as shown in FIG. 2, taken in partial section and drawn to a scale enlarged therefrom.
Figure 4:
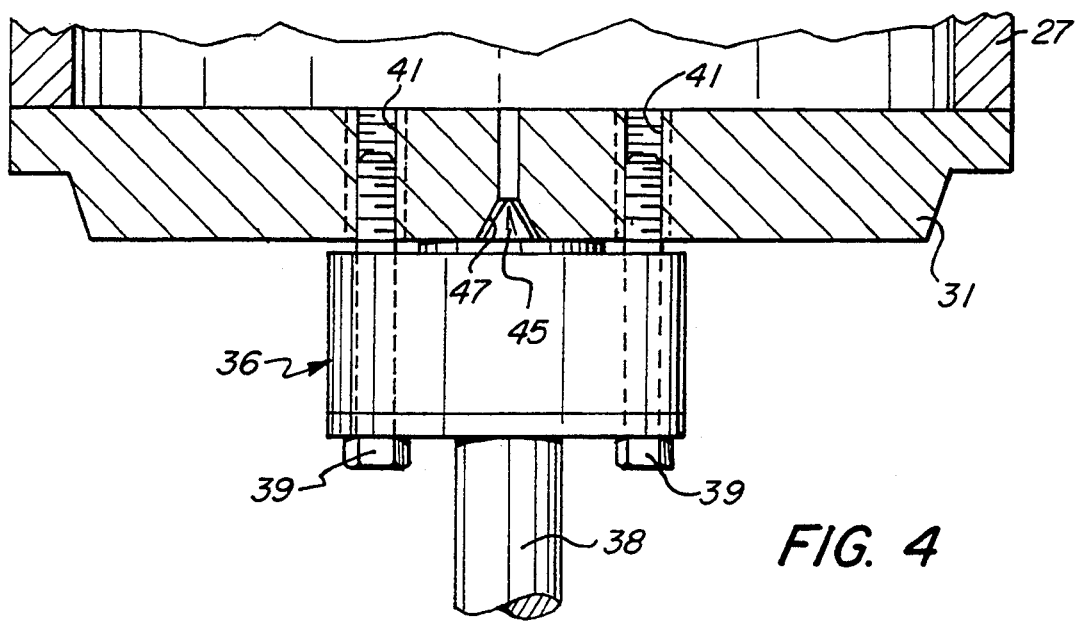
FIG. 4 is a fragmentary sectional view of the apparatus, taken along line 4—4 of FIG. 3 and drawn to a somewhat further enlarged scale.
Figure 5:
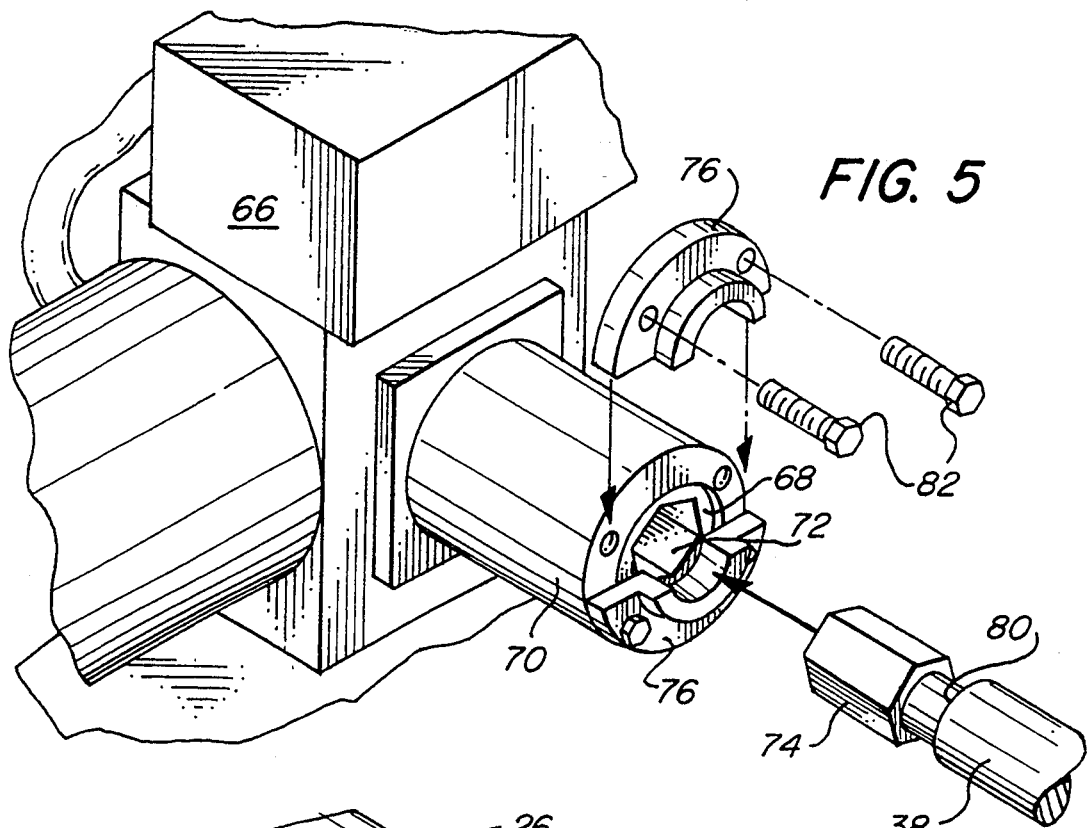
FIG. 5 is an exploded perspective view showing the connection of the boring bar drive shaft to the motor/gearbox unit.
Figure 6:
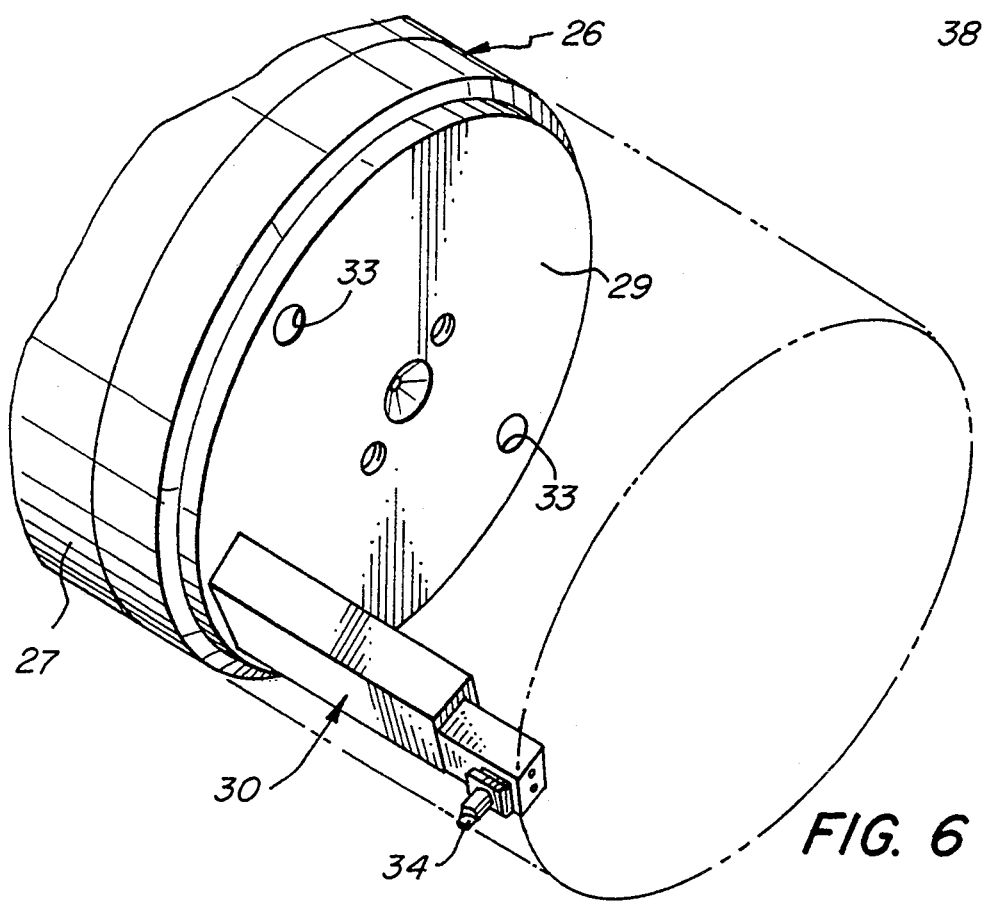
FIG. 6 is a fragmentary perspective view of the forward end portion of the boring bar.
Figure 7:
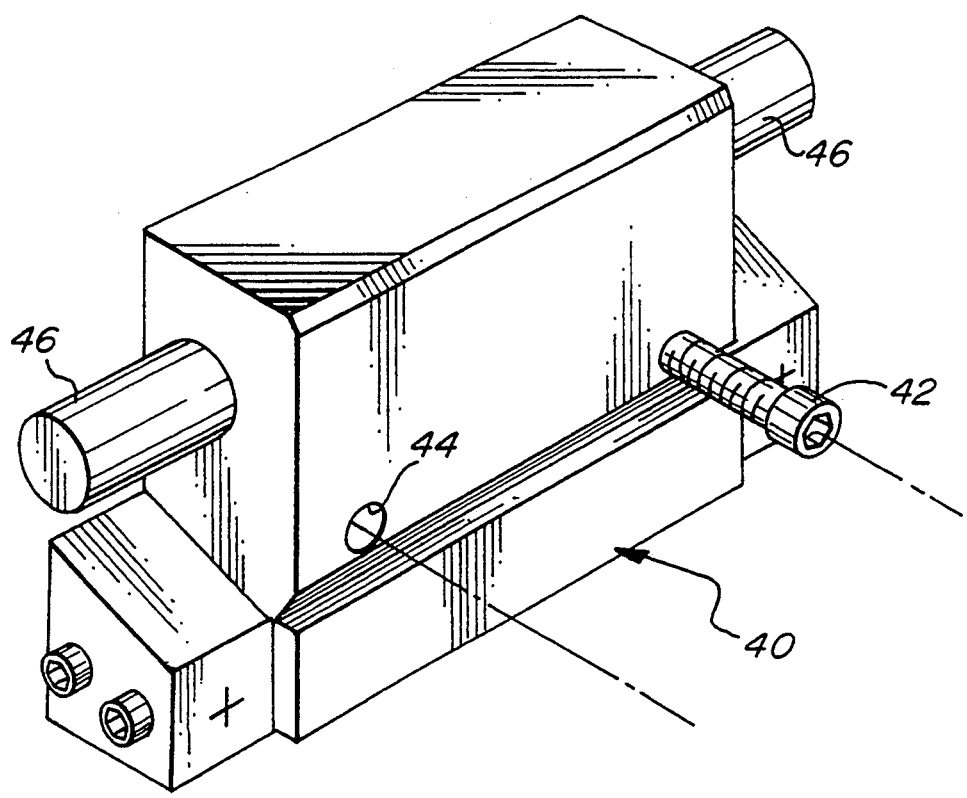
FIG. 7 is a perspective view of the mounting block for the clamping assembly of which the apparatus is comprised.

Referring initially to FIGS. 1 and 2 of the drawings, depicted therein are the forward section of an automatic screw machine, generally designated by the numeral 10, and the adjacent section generally designated by the numeral 12; the revolving head of the machine is normally mounted in the section 10, and the stationary head is normally mounted in section 12. Further details of a typical revolving head of an automatic screw machine, and the associated housing structure, are provided in Nowak U.S. Pat. No. 5,205,376, which is of common assignment herewith and of which the specification is hereby incorporated hereinto by reference.

The housing in section 10 consists of a base, generally designated 14, and an upper frame generally designated 16, normally secured in assembly (by means not shown) with the head (also not shown) journalled therebetween. The base 14 includes a forward wall portion 13 and a rearward wall portion 15, each having a semicylindrical bearing surface 18 formed thereon. Similarly, the upper frame 16 has a forward portion 17 and a rearward portion 19, each with a semi-cylindrical bearing surface 20.

The rearward section 12 includes a saddle member 22, on which is formed a semi-cylindrical bearing surface 24. Although the stationary head that is normally seated on the surface 24 is pinned against movement during operation of the machine, the surface 24 must be true and accurate to permit rotation of the head for alignment purposes.

The boring bar, generally designated by the numeral 26, has a cylindrical body comprised of a tubular shell 27 closed at its opposite ends by circular plates 29 and 31 (the holes 33 therein are for the relief of gas pressure, generated during welding operations). The boring bar 26 is seated with its body surface 28 in direct contact upon the saddle surface 24, the diameter of the shell 27 being the same as that of the stationary head for which it is substituted. A tool assembly, generally designated by the numeral 30, is mounted upon the forward plate 29 of the boring bar 26, and supports a radially outwardly directed cutting element 34. One end of a drive shaft 38 is secured to the rearward plate 31 of the boring bar by a coupling assembly, generally designated by the numeral 36, through which both angular and rectilinear motion are transmitted (by means hereinafter to be described). The coupling assembly 36 includes bolts 39, which are engaged in threaded apertures 41 in plate 31, and a conical centering element 45 received in the mating recess 47.

The clamping assembly is attached to machine section 12 by means of a mounting block, generally designated by the numeral 40, which has holes 44 through which the threaded end portions of cap screws 42 pass into engagement with the machine housing. Stub axles 46 extend from the opposite ends of the block 40, and serve to pivotably mount a pair of clamping arms, each generally designated by the numeral 48; the transverse apertures 49 through the arms 48 receive the axles 46. A threaded passage 50 extends perpendicularly to the aperture 49 through the lower end of each arm 48, and receives a set screw 52. The screw 52 engages a coil spring 54 seated within an inner portion of the aperture 50, which in turn bears upon a confronting surface of the mounting block 40 to enable biasing of the arms 48 upon the boring bar 26 with adjustable levels of force.

At its upper end, each arm 48 carries an underlying bearing element 56, a gravity-feed oiling device 60, and a wiping element 64. A stem portion of the oiling device 60 is engaged in a threaded recess 61, which tapers downwardly to a small duct 62 and opens at the surface of the bearing element 56 to provide lubricant thereto.

The boring bar is rotated by a motor and gearbox unit, generally designated by the numeral 66. The unit includes a driven coupling piece 68, which is rotatably mounted within a cylindrical sleeve 70 and has an inwardly extending hexagonal socket 72 therein, the latter receiving a mating hexagonal lug 74 on the end of the drive shaft 38; the assembly functions as a constant-velocity connection, promoting smoothness and uniformity in the drive and thereby accuracy in the boring operations. A split-ring retainer 76 secures the lug 74 in engagement with the coupling piece 68, the parts of the retainer being affixed to the sleeve 70 by bolts 82; the collar elements 78 thereon seat within the circumferential recess 80 formed in the shaft 38 adjacent the lug 74.

The motor/gearbox unit 66 is supported upon a table 67 which is, in turn, supported by a pair of parallel screws 71 (only one of which is visible in FIG. 1). The screws are engaged in threaded openings (not seen) formed in the blocks 69 on the bottom of the table 67. Rotation of the screws 71 (powered by the motor unit 66) effects linear advancement and retraction of the table 67, and thereby of the boring bar 26 through the drive shaft connection. Crosspieces 73, slidably seated on rails 75, support the screws 71; the rails 75 are in turn supported upon the base 77. Thus, the cooperating parts 73, 75 permit lateral adjustment, in a horizontal plane, of the entire support system upon which the unit 66 is disposed, thereby facilitating precise lateral alignment with the boring bar 26. Vertical alignment is facilitated by the jacking mechanism 86, the table 88 of which supports the sections of the machine being reconditioned.

It will be understood that the motor unit 66 effects simultaneous rotation and (supported as described) linear advance of the boring bar. The tool 30 is disposed to cause its cutting element 34 to act upon the inner surfaces 18, 20 of the rotary head frame components 15, 17, 19, for enlargement of the opening therethrough, the frame components having been rebuilt to enable the same, as is conventional.

The broad concept underlying the present invention resides in the means by which a boring bar may be mounted for achieving exact alignment of a rebored opening with a reference surface. More specifically, it concerns the attainment of such alignment between the opening in the rotary head section of a machine and the cylindrical surface of the saddle on which the stationary head section is normally supported. Such alignment is inherently achieved through the practice of the instant invention because the boring bar body bears directly upon the saddle surface throughout the boring operations, and has the same diameter as the stationary head that it replaces. When the stationary head is again put in place, therefore, it will lie in precise coaxial alignment with the rebored opening.

The foregoing detailed description emphasizes application of the instant method and apparatus to automatic screw machines, as is indeed regarded to be the most novel and important utility. It will be appreciated however that the concept is not so limited, and that the technique can be used for boring of a circular opening through other machine parts, provided an existing surface of the same machine is coaxial with the desired opening and is adapted to support a boring bar for rotation and linear advance.

Thus, it can be seen that the present invention provides a novel method of boring for producing a cylindrical opening through a portion of a machine, which opening lies in precise coaxial relationship to an existing cylindrical surface of the machine; the invention also provides a novel apparatus and system for implementation of the method. In its more specific embodiments, the invention provides a method, apparatus, and system for boring the revolving head-mounting frame portion of an automatic screw machine.

Having this described the invention, what is claimed is:

1. In a method of boring to produce a cylindrical opening on an axis through a revolving head-mounting frame portion of a machine, the machine also having, rearwardly adjacent the frame portion, a saddle with a semi-cylindrical bearing surface disposed on said axis for underlying support of a stationary head of the machine, the improvement comprising: providing a boring bar having a cylindrical body of equal diameter to said bearing surface, and having a boring tool on an end portion of said body; seating directly said boring bar on said bearing surface, with the stationary head removed and with said boring tool forwardly disposed; and effecting the linear advance and rotation of said boring bar, on said axis, to cause said tool to effect boring of said frame portion to produce said cylindrical opening therethrough.

2. The method of claim 1 wherein said boring bar is advanced and rotated at constant linear and angular velocities.

3. Apparatus for boring a cylindrical opening on an established axis through a revolving head-mounting frame portion of a machine, the machine also having, rearwardly adjacent the frame portion, a saddle with a semi-cylindrical bearing surface disposed on the established axis for underlying support of a stationary head of the machine, the combination comprising: a boring bar having a cylindrical body with opposite end portions, the diameter of said body being equal to that of the bearing surface of the machine saddle, said boring bar having a boring tool on one of said end portions and having a drive connection on the opposite end portion thereof; and a clamping assembly disengageably attachable to the machine, said clamping assembly including components disposed to overlie the saddle of the machine and constructed to slidably engage said cylindrical body of said boring bar, for linear advance and rotation on the established axis, and to hold it in stable engagement upon the saddle bearing surface.

4. The apparatus of claim 3 wherein said clamping assembly includes adjustable biasing means for applying clamping force of variable magnitude upon said boring bar.

5. The apparatus of claim 3 wherein said clamping assembly comprises mounting means for disengageable attachment to the machine, and a plurality of arcuate arms extending from said mounting means and including end portions disposed in overlying contact with said boring bar when said clamping assembly is so attached.

6. The apparatus of claim 5 wherein each of said end portions includes means for distributing lubricant to the surface of said boring bar body in contact therewith.

7. A system for boring a cylindrical opening on an established axis through a revolving head-mounting frame portion of a machine, the machine also having, rearwardly adjacent the frame portion, a saddle with a semi-cylindrical bearing surface disposed on the established axis for underlying support of a stationary head of the machine, the combination comprising:

(a) apparatus including a boring bar having a cylindrical body with opposite end portions, the diameter of said body being equal to that of the bearing surface of the machine saddle, said boring bar having a boring tool on one of said end portions and having a drive connection on the opposite end portion thereof; and a clamping assembly disengageably attachable to the machine, said clamping assembly including components disposed to overlie the saddle of the machine and constructed to slidably engage said cylindrical body of said boring bar, for linear advance and rotation on the established axis, and to hold it in stable engagement upon the saddle bearing surface;

(b) drive means for producing driving force to effect linear advance and rotation of said boring bar; and (c) connecting means operatively connecting said drive means to said drive connection of said boring bar for transmitting such driving force thereto.

8. The system of claim 7 wherein said connecting means comprises a mechanism for so transmitting such driving force as to maintain rotation and advance of said boring bar at constant angular and linear velocities.

9. The system of claim 7 additionally including first support means, for supporting said drive means, and second support means for supporting the machine, said first support means being movable in a horizontal plane and in a direction perpendicular to the established axis, and said second support means being movable in a vertical plane.

* * * * *